(12) United States Patent
Nagata

(10) Patent No.: US 8,269,754 B2
(45) Date of Patent: Sep. 18, 2012

(54) PORTABLE TERMINAL, DISPLAY CONTROL PROGRAM, AND DISPLAY CONTROL METHOD

(75) Inventor: Keizo Nagata, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/203,892

(22) PCT Filed: Jan. 25, 2011

(86) PCT No.: PCT/JP2011/000390
§ 371 (c)(1),
(2), (4) Date: Aug. 30, 2011

(87) PCT Pub. No.: WO2011/093062
PCT Pub. Date: Aug. 4, 2011

(65) Prior Publication Data
US 2011/0310073 A1 Dec. 22, 2011

(30) Foreign Application Priority Data
Jan. 26, 2010 (JP) .................. 2010-014645

(51) Int. Cl.
G06F 3/038 (2006.01)
G06F 3/041 (2006.01)
G09G 5/00 (2006.01)
G09G 3/36 (2006.01)
H04B 1/38 (2006.01)

(52) U.S. Cl. .......... 345/207; 345/1.1; 345/1.3; 345/102; 345/173; 455/73

(58) Field of Classification Search ............ 345/1.1–3.4, 345/207
See application file for complete search history.

(56) References Cited

U.S. PATENT DOCUMENTS
5,394,166 A * 2/1995 Shimada .................. 345/98
(Continued)

FOREIGN PATENT DOCUMENTS
JP 2006-065022 A 3/2006
(Continued)

OTHER PUBLICATIONS

International Search Report and Written Opinion dated Mar. 15, 2011 issued by the Japanese Patent Office for International Application No. PCT/JP2011/000390.

Primary Examiner — Sumati Lefkowitz
Assistant Examiner — David Tung
(74) Attorney, Agent, or Firm — Procopio, Cory, Hargreaves & Savitch LLP

(57) ABSTRACT

A mobile terminal controls a display unit to display a first image in a first display area at a first luminance and to display a second image in a second display area at the first luminance, under a first condition in which brightness measured by a optical sensor is lower than a first threshold, and controls the display unit to display a third image in the first display area at a second luminance that is higher than the first luminance and to set a luminance in the second display area to a third luminance that is lower than the first luminance, under a second condition in which the measured brightness is equal to or higher than the first threshold, a content of the third image being determined so as to include a content of the first image and a content of the second image.

10 Claims, 7 Drawing Sheets

U.S. PATENT DOCUMENTS

| | | | |
|---|---|---|---|
| 7,292,875 B2 * | 11/2007 | Chan et al. | 455/550.1 |
| 2005/0282561 A1 * | 12/2005 | Wu | 455/456.6 |
| 2006/0044300 A1 * | 3/2006 | Koyama et al. | 345/207 |
| 2007/0188438 A1 * | 8/2007 | Fletcher et al. | 345/102 |
| 2009/0122069 A1 | 5/2009 | Furusawa et al. | |
| 2009/0231313 A1 * | 9/2009 | Teranishi et al. | 345/207 |
| 2009/0325644 A1 * | 12/2009 | Tseng | 455/566 |
| 2010/0227651 A1 * | 9/2010 | Kim | 455/566 |

FOREIGN PATENT DOCUMENTS

| | | |
|---|---|---|
| JP | 2009-124266 A | 6/2009 |
| JP | 2009-162839 A | 7/2009 |

* cited by examiner

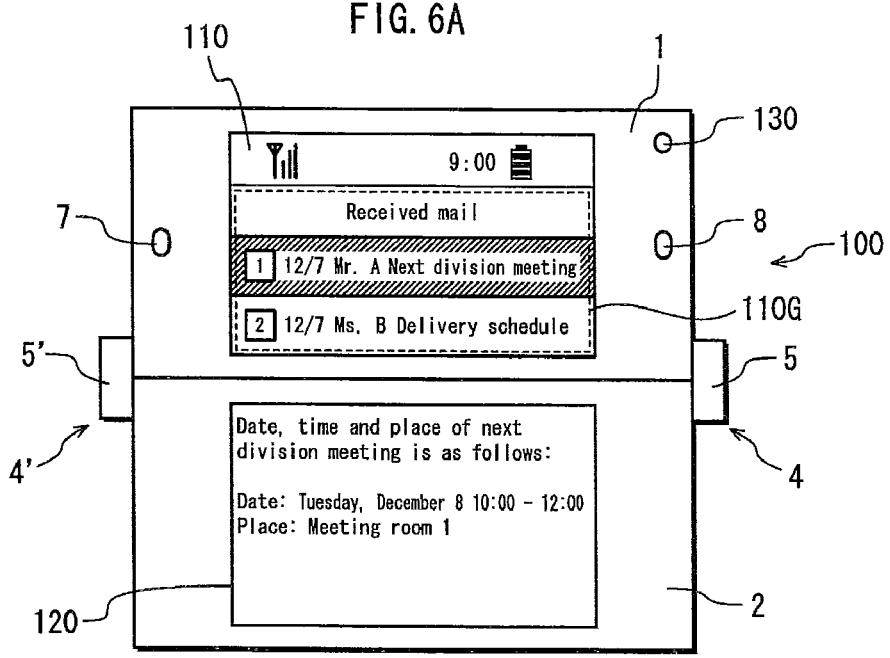
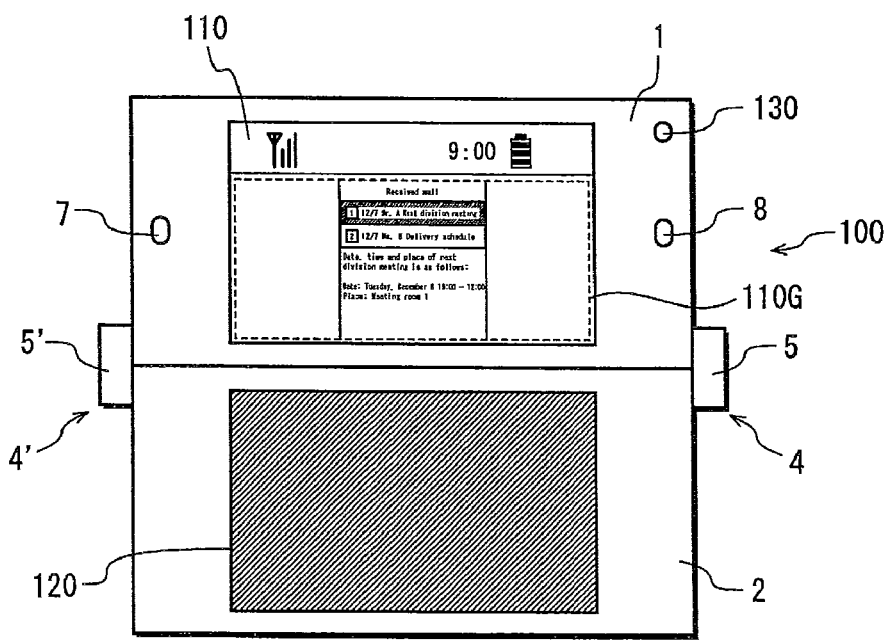

PORTABLE TERMINAL, DISPLAY CONTROL PROGRAM, AND DISPLAY CONTROL METHOD

TECHNICAL FIELD

The present invention relates to a mobile terminal, such as a mobile phone, that has a plurality of display areas, and in particular to a technology for controlling screen display.

BACKGROUND ART

Several technologies to ensure visibility of a display unit of a mobile terminal, such as a mobile phone, are known. One is a technology of controlling a luminance in the display unit according to brightness of ambient light. Another is a technology of displaying an image on a large screen having a plurality of display areas (display panels).

For example, Patent Literature 1 discloses a mobile phone including first and second display units and an optical sensor. When brightness measured by the optical sensor is equal to or lower than a predetermined value, the mobile phone automatically causes the second display unit to display no image, and causes only the first display unit to display an image while decreasing a luminance in a backlight corresponding to the first display unit. This technology reduces glare occurring when a user views an image on a screen in a dark place, and thus ensures visibility of the screen in the dark place. This technology also reduces power consumption in displaying an image.

CITATION LIST

Patent Literature

[Patent Literature 1]
Japanese Patent Application Publication No. 2006-65022

SUMMARY OF INVENTION

Technical Problem

The problem is that, for example, if the user moves from a well-lighted place to a dark place when he/she creates a mail on a mail creation screen displayed by the first display unit with reference to a web page displayed by the second display unit, the user becomes unable to refer to the web page, since the mobile phone disclosed in Patent Literature 1 causes the second display unit to display no image as described above. That is to say, it is inconvenient for a user to use the mobile phone disclosed in Patent Literature 1 if he/she wants to continue viewing contents displayed by the first and second display units after moving form a well-lighted place to a dark place.

The mobile phone disclosed in Patent Literature 1 also fails to take into account ensuring of visibility when a user moves from a dark place to a well-lighted place.

Since visibility of a display unit is reduced when a user moves from a dark place to a well-lighted place, reduction in visibility of the display unit is suppressed generally by increasing a luminance in the display unit. The increase in luminance, however, leads to an increase in power consumption. This is particularly a problem in a mobile terminal having a plurality of display areas.

The present invention has been conceived in view of such problems. A purpose of the present invention is to provide a mobile terminal having at least two display areas that continues displaying contents having been displayed in the at least two display areas when brightness of ambient light changes, while suppressing increase in power consumption in displaying images and reduction in visibility.

Solution to Problems

In order to solve the above-presented problems, one aspect of the present invention is a mobile terminal comprising: a display unit having first and second display areas; an optical sensor configured to measure brightness of ambient light; and a control unit configured to, under a first condition in which the brightness measured by the optical sensor is lower than a first threshold, control the display unit to display a first image in the first display area at a first luminance, and to display a second image in the second display area at the first luminance, and under a second condition in which the measured brightness is equal to or higher than the first threshold, control the display unit to display a third image in the first display area at a second luminance that is higher than the first luminance, and to set a luminance in the second display area to a third luminance that is lower than the first luminance, a content of the third image being determined so as to include a content of the first image and a content of the second image.

Here, the content of the third image is determined so as to include the content of the first image and the content of the second image. Objects constituting the third image may be displayed in the same manner as those constituting each of the first and second images, or may be displayed in a different manner from those constituting each of the first and second images. That is to say, the third image may include an object that is obtained by increasing or decreasing a size of an object constituting each of the first and second images or by connecting a plurality of objects constituting each of the first and second images. Also, arrangement of one or more objects constituting the third image may differ from that of one or more objects constituting each of the first and second images.

Advantageous Effects of Invention

According to the mobile terminal of the present invention having the above-presented structure, contents displayed in the at least two display areas are continuously displayed when brightness of ambient light changes, while increase in power consumption in displaying images and reduction in visibility are suppressed.

BRIEF DESCRIPTION OF DRAWINGS

FIG. 6A shows an example of a display on a mail screen of the mobile phone 100 in the dark mode. FIG. 6B shows an example of a display on the mail screen of the mobile phone 100 in the light mode.

DESCRIPTION OF EMBODIMENTS

In the following, description is made on a mobile terminal in an embodiment of the present invention, taking a mobile phone as an example.

Embodiment

<Overview>

The mobile phone in the present embodiment includes two touch panels and an optical sensor. The mobile phone switches between a "dark mode" and a "light mode" according to brightness measured by the optical sensor, and operates accordingly.

Here, the "dark mode" is a mode in which a display panel of each of the touch panels displays an image, and a backlight corresponding to each display panel turns on so that a luminance in each display panel is set to a low level. On the other hand, the "light mode" is a mode in which only a display panel of one of the touch panels displays an image, and a backlight corresponding to the display panel that displays the image turns on so that a luminance in the display panel is set to a high level. A display panel of the other touch panel displays no image, and a backlight corresponding to the display panel of the other touch panel turns off.

In the present application, hereinafter, a luminance at a low level, a luminance at a high level and no luminance (at the time of turning off a backlight) are respectively referred to as a "first luminance", a "second luminance" and a "third luminance" to describe the following examples.

<Configuration of Apparatus>

First, description is made on configuration of the mobile phone 100 in the present embodiment.

Figure 1A:
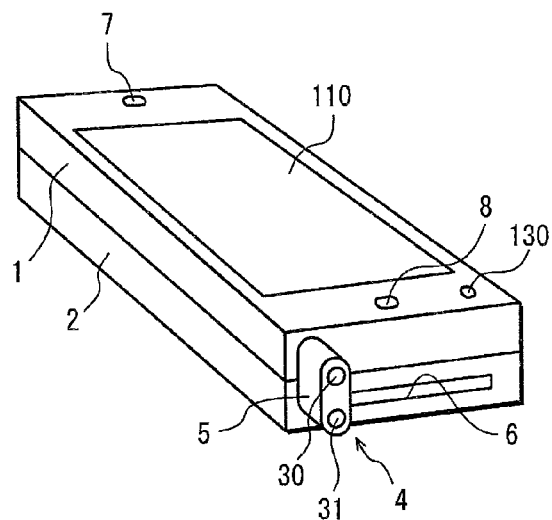
FIG. 1A shows an appearance of a mobile phone 100 in an embodiment in a closed state.
Figure 1B:
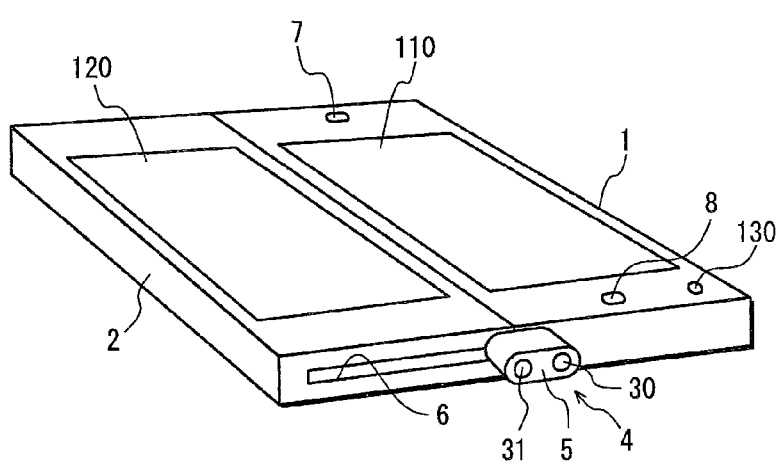
FIGS. 1B and 1C each show an appearance of the mobile phone 100 in an open state.
Figure 1C:
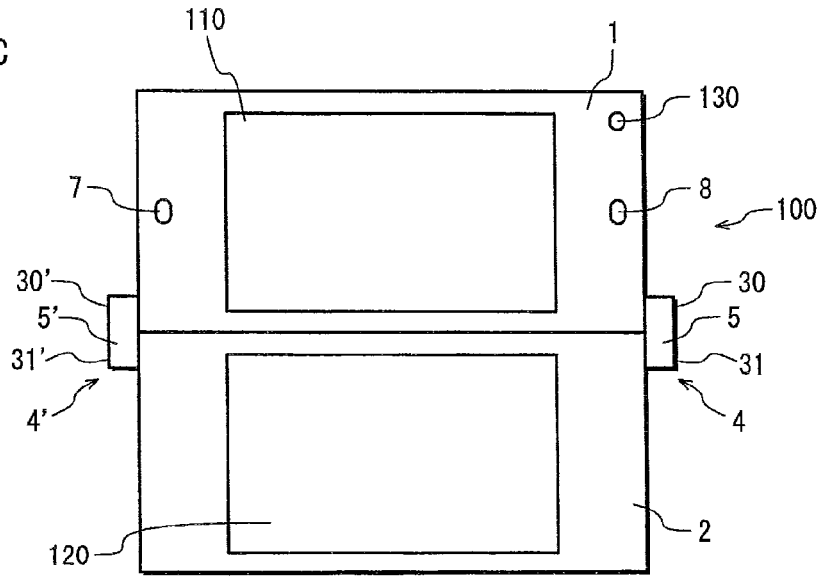

FIG. 1A is a perspective view showing an appearance of the mobile phone 100 in a closed state. FIG. 1B is a perspective view showing an appearance of the mobile phone 100 in an open state. FIG. 1C is a front elevational view showing an appearance of the mobile phone 100 in an open state.

As shown in FIGS. 1A, 1B and 1C, the mobile phone 100 is a sliding-type terminal including a first housing 1, a second housing 2 and coupling mechanisms 4 and 4'. The first housing 1 and the second housing 2 are movable relative to each other. Each of the coupling mechanisms 4 and 4' couples the first housing 1 and the second housing 2 together.

The first housing 1 includes a touch panel 110, a speaker 7, a microphone 8 and an optical sensor 130. The second housing 2 includes a touch panel 120.

As shown in FIGS. 1A and 1B, a guide groove 6 is formed in a lateral side of the second housing 2 in which the coupling mechanism 4 is provided. Similarly, another guide groove is formed in a lateral side of the second housing 2 in which the coupling mechanism 4' is provided.

As shown in FIGS. 1A and 1B, the coupling mechanism 4 has a coupling piece 5 and pins 30 and 31 to couple a lateral side of the first housing 1 and a lateral side of the second housing 2. Similarly, as shown in FIG. 1C, the coupling mechanism 4' has a coupling piece 5' and pins 30' and 31'.

The pins 30 and 30' are each pivotally supported by the first housing 1. Each of the pins 31 and 31' engages a corresponding guide groove. By each of the pins 31 and 31' sliding along the corresponding guide groove, the first housing 1 and the second housing 2 move relative to each other.

As shown in FIG. 1A, when the mobile phone 100 is in a closed state, the touch panel 120 cannot be seen from the outside as the first housing 1 is placed on the top of the second housing 2. By each of the pins 31 and 31' of the respective coupling mechanism 4 and 4' sliding along a corresponding guide groove, the first housing 1 moves along a surface of the second housing 2. Then, by the pins 30 and 30' respectively rotating about the pins 31 and 31', the mobile phone 100 is switched to an open state in which a surface of the first housing 1 and the surface of the second housing 2 lie in approximately the same plane, as shown in FIGS. 1B and 1C. When the mobile phone 100 is in an open state, the touch panels 110 and 120 can be seen from the outside.

<Display Example>

The following describes a display of the mobile phone 100 in each mode, taking a standby screen as an example.

Figure 2A:
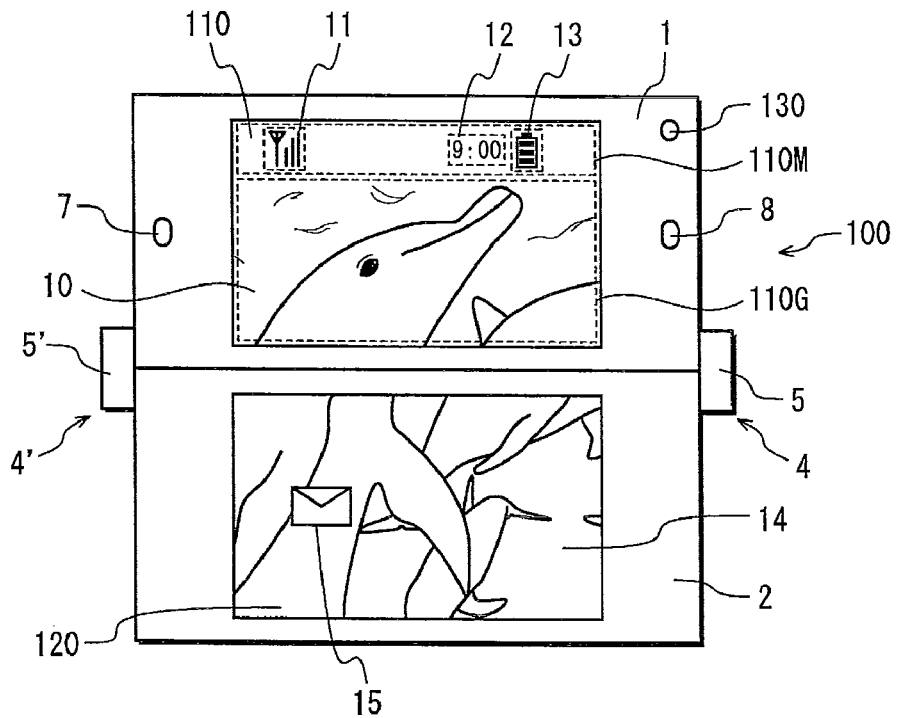
FIG. 2A shows an example of a display on a standby screen of the mobile phone 100 in a dark mode.
Figure 2B:
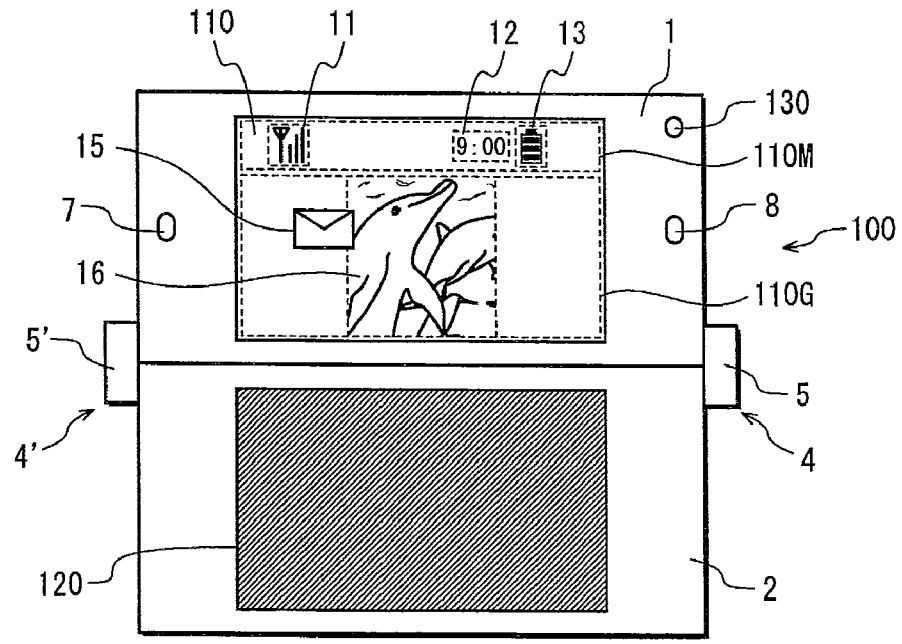
FIG. 2B shows an example of a display on the standby screen of the mobile phone 100 in a light mode.

FIG. 2A shows an example of a display on a standby screen of the mobile phone 100 in a dark mode. FIG. 2B shows an example of a display on the standby screen of the mobile phone 100 in a light mode.

FIG. 2A shows an example in which a display panel of the touch panel 110 displays a signal strength indicator 11, a clock 12, a battery level indicator 13, and a background image 10, and a display panel of the touch panel 120 displays a background image 14 and a mail icon 15 on the background image 14.

Note that, as shown in FIG. 2A, a display area of the display panel of the touch panel 110 is composed of an indicator display area 110M and an image display area 110G. In this example, the signal strength indicator 11, the clock 12 and the battery level indicator 13 are displayed in the indicator display area 110M, and the background image 10 is displayed in the image display area 110G.

Note that, in the present application, the expression "to select an icon" is used to indicate a state where a user touches the icon with the use of his/her finger or the like. Upon selection of the mail icon 15, the mobile phone 100 performs a processing to start a mail application.

FIG. 2B shows an example in which the signal strength indicator 11, the clock 12, and the battery level indicator 13 are displayed in the indicator display area 110M of the display panel of the touch panel 110, similarly to those shown in FIG. 2A, the mail icon 15 and a background image 16 are displayed in the image display area 110G of the display panel of the touch panel 110, and the display panel of the touch panel 120 displays no image. Note that hatched lines in the touch panel 120 shown in FIG. 2B indicates that the display panel of the touch panel 120 displays no image.

Here, the background image 16 has been generated by vertically connecting the background image 10 to the background image 14 and then reducing a size of the connected image so as to be within the image display area 110G of the display panel of the touch panel 110.

The positions and sizes of the signal strength indicator 11, the clock 12 and the battery level indicator 13 shown in FIG. 2A are respectively the same as those of the signal strength indicator 11, the clock 12 and the battery level indicator 13 shown in FIG. 2B. Also, a position of the mail icon 15 shown in FIG. 2A in a lateral direction is the same as that of the mail icon 15 shown in FIG. 2B in the lateral direction.

In summary, objects that are separately displayed by the display panels of the touch panels in FIG. 2A (i.e. background images 10 and 14, the signal strength indicator 11, the clock 12, the battery level indicator 13, and the mail icon 15) are all displayed by one display panel in FIG. 2B, although a size of each background image is reduced.

The mobile phone 100 operates in the dark mode under a condition (hereinafter, referred to as a "dark condition") in which brightness measured by the optical sensor 130 is equal to or lower than a second threshold (e.g. approximately 1000 lx), which is equivalent to normal room brightness and brightness in the shade. That is to say, under the dark condition, the mobile phone 100 causes a display panel of each of the touch panels 110 and 120 to display an image, and causes a backlight corresponding to each display panel to turn on so that a luminance in each display panel is set to a low level, as shown in FIG. 2A.

The mobile phone 100 operates in the light mode under a condition (hereinafter, referred to as a "light condition") in which the brightness measured by the optical sensor 130 is equal to or higher than a first threshold (e.g. approximately 100,000 lx), which is equivalent to brightness in the sun. That is to say, under the light condition, the mobile phone 100 controls only the display panel of the touch panel 110 to display an image, and controls a backlight corresponding to the display panel of the touch panel 110 to turn on so that a luminance in the display panel of the touch panel 110 is set to a high level, and controls a backlight corresponding to the display panel of the touch panel 120 to turn off, as shown in FIG. 2B.

When a condition based on the brightness measured by the optical sensor 130 changes from the dark condition to the light condition, the mobile phone 100 switches from the dark mode to the light mode, and operates accordingly. When the condition changes from the light condition to the dark condition, the mobile phone 100 switches from the light mode to the dark mode, and operates accordingly.

Even when a display mode of the mobile phone 100 is switched from a display mode shown in FIG. 2A to a display mode shown in FIG. 2B, since objects separately displayed by the display panels of the touch panels shown in FIG. 2A are all displayed by one display panel shown in FIG. 2B, the mobile phone 100 does not cause any inconvenience that, for example, prevents a user from viewing a content the user wishes to view.

When a display mode of the mobile phone 100 is switched to the display mode shown in FIG. 2B, a backlight corresponding to the display panel of the touch panel 110 turns on so that a luminance in the display panel of the touch panel 110 increases, and a backlight corresponding to the display panel of the touch panel 120 turns off. Therefore, when a user uses the mobile phone 100 in the sun, power consumption is reduced while visibility is ensured.

In addition, positions and sizes of the signal strength indicator 11, the clock 12 and the battery level indicator 13 shown in FIG. 2A are respectively the same as those of the signal strength indicator 11, the clock 12 and the battery level indicator 13 shown in FIG. 2B. Therefore, even when the mobile phone 100 is in a display mode in which only the display panel of the touch panel 110 displays an image as shown in FIG. 2B, it is easy for a user to see these indicators. Also, a size of the mail icon 15, which is to be selected by a user touching with his/her finger, shown in FIG. 2A is the same as that of the mail icon 15 shown in FIG. 2B. Therefore, even when the mobile phone 100 is in a display mode in which only the display panel of the touch panel 110 displays an image as shown in FIG. 2B, usability is ensured.

<Functional Structure>

Figure 3:
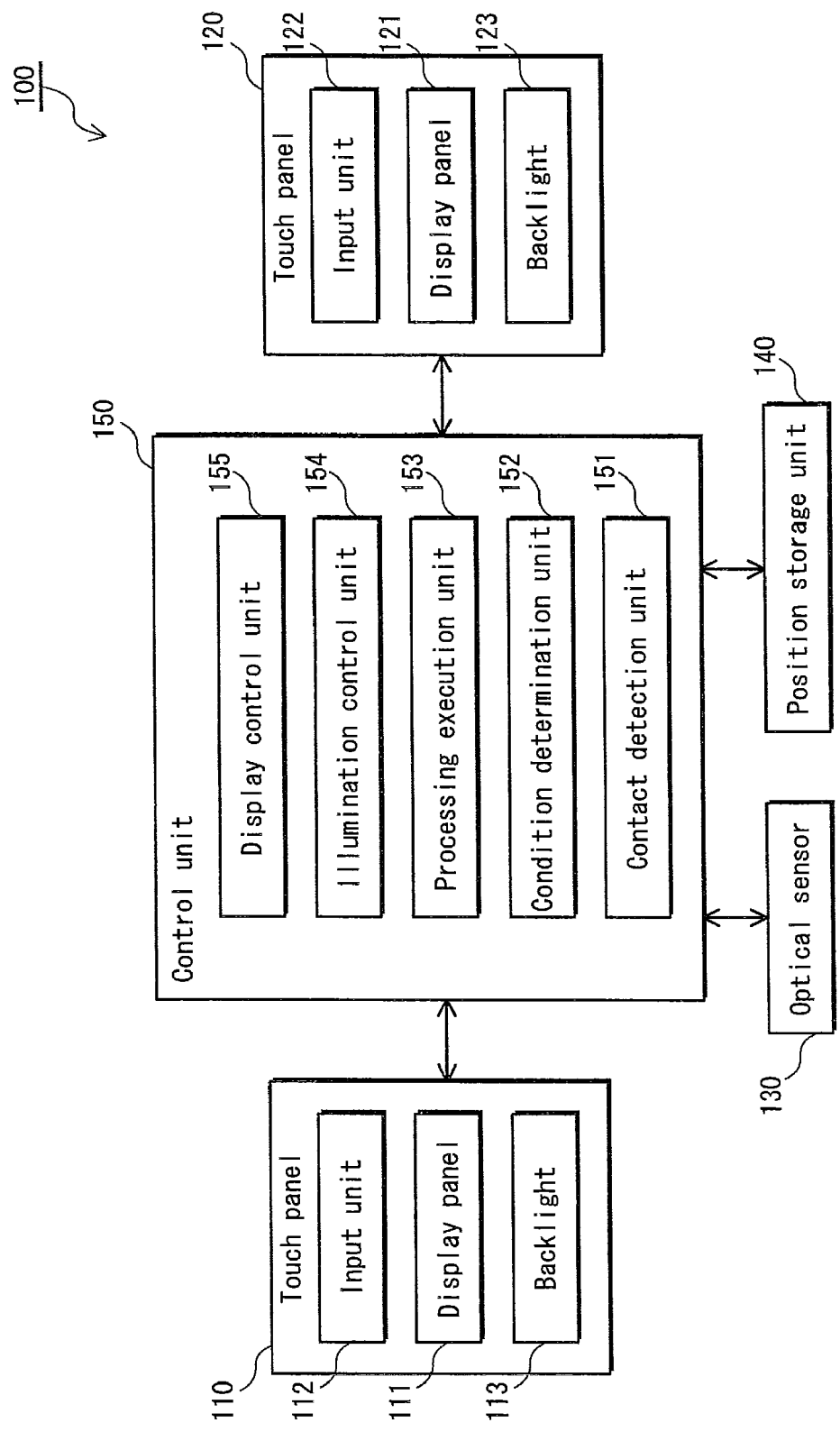
FIG. 3 is a block diagram showing a functional structure of main components of the mobile phone 100.

FIG. 3 is a block diagram showing a functional structure of main components of the mobile phone 100.

As shown in FIG. 3, the mobile phone 100 includes the touch panels 110 and 120, the optical sensor 130, a position storage unit 140 and a control unit 150.

Note that, although the mobile phone 100 includes a communication unit, which a typical mobile phone includes, the speaker 7 and the microphone 8, which are shown in FIGS. 1A, 1B and 1C, and the like, these units are omitted from FIG. 3. The mobile phone 100 also includes a processor and a memory. Each function of the control unit 150 is achieved by the processor executing a program stored in the memory. Note that each object to be displayed by the display panel of each touch panel is stored in the memory.

The touch panel 110 includes a display panel 111, an input unit 112 and a backlight 113. Similarly, the touch panel 120 includes a display panel 121, an input unit 122 and a backlight 123.

Each of the display panels 111 and 121 includes an LCD (Liquid Crystal Display). Each of the display panels 111 and 121 is a circuit for displaying various images on the LCD upon instructed by the control unit 150. In the present embodiment, the number of pixels of each LCD is 800×480 (width×height).

Each of the input units 112 and 122 is a circuit for detecting contact made by a user. During detection, the each of the input units 112 and 122 outputs, to the control unit 150, coordinates (x, y) of a position to which contact has been made at each time interval (e.g. every 25 ms).

Note that, hereinafter, description is made based on the premise that coordinates at an upper left position and coordinates at a lower right position of a display panel of each touch panel shown in FIG. 1C are respectively (0, 0) and (799, 479). Each input unit is embodied, for example, as a capacitance-type touch sensor. Hereinafter, the coordinates output by each input unit are also referred to as "physical coordinates".

According to instructions from the control unit 150, each of the backlights 113 and 123 turns on so that a luminance in a corresponding display panel is set to an appropriate level (i.e. a low level or high level), or turns off.

The optical sensor 130 is a circuit for detecting brightness of ambient light. The optical sensor 130 outputs, to the control unit 150, a signal whose voltage level corresponds to the detected brightness. The optical sensor 130 is embodied, for example, as a photodiode.

The position storage unit 140 is a memory area storing therein coordinates indicating a display position of each object displayed by the display panels 111 and 121 of the touch panels in each of the light and dark modes. The coordinates are composed of a set of coordinates at an upper left position and coordinates at a lower right position of a rectangle including each object. These coordinates are coordinates in a logical coordinate system (hereinafter, referred to as "logical coordinates").

The following describes the logical coordinate system.

Figure 4:
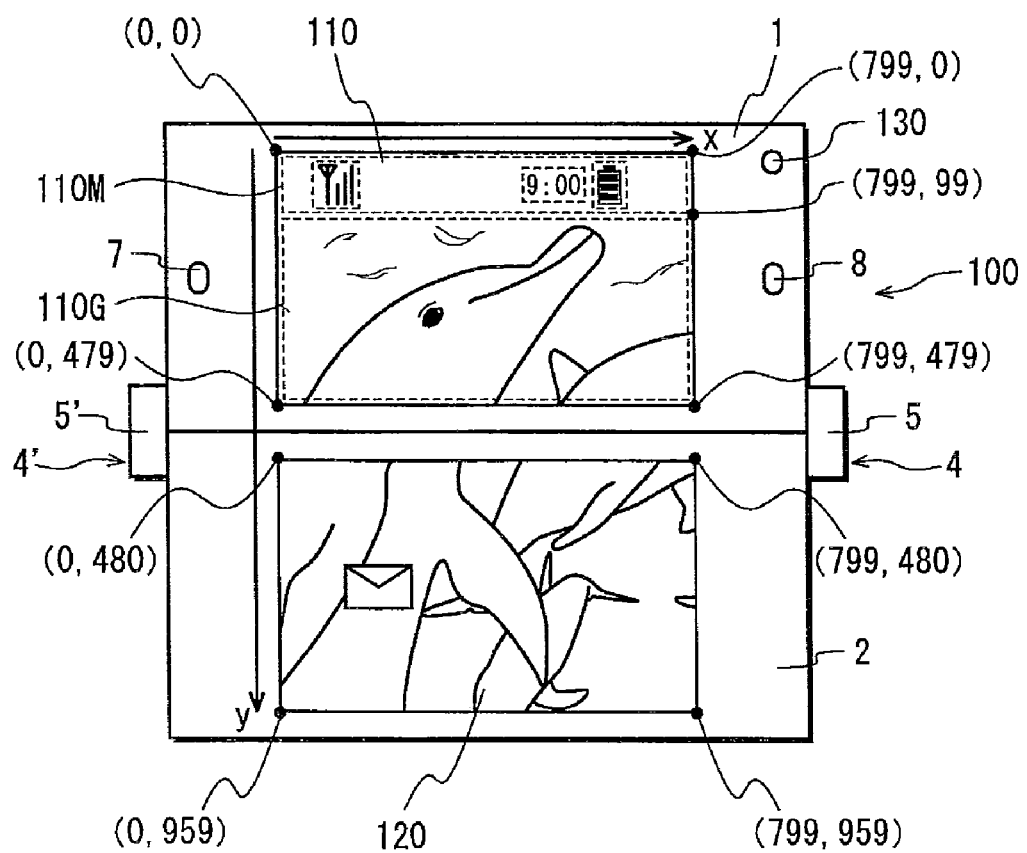
FIG. 4 illustrates a logical coordinate system of the mobile phone 100.

FIG. 4 illustrates the logical coordinate system.

As shown in FIG. 4, the logical coordinate system is a coordinate system in which an upper left position of the display panel 111 of the touch panel 110 is taken as an origin (0, 0), and an x-axis is taken to be horizontal and a y-axis is taken to be vertical.

FIG. 4 illustrates examples of coordinates in the logical coordinate system. In FIG. 4, coordinates at an upper right position, coordinates at a lower left position and coordinates at a lower right position of the display panel 111 of the touch panel 110 are respectively (799, 0), (0, 479) and (799, 479).

Here, the indicator display area 110M of the display panel 111 of the touch panel 110 is a rectangular area specified by coordinates at an upper left position (0, 0) and coordinates at a lower right position (799, 99). The image display area 110G of the display panel 111 of the touch panel 110 is a rectangular area specified by coordinates at an upper left position (0, 100) and coordinates at a lower right position (799, 479).

Coordinates at an upper left position, coordinates at an upper right position, coordinates at a lower left position and coordinates at a lower right position of the display panel 121 of the touch panel 120 are respectively (0, 480), (799, 480), (0, 959) and (799, 959).

Accordingly, the physical coordinates received from the touch panel 110 correspond to logical coordinates in the logical coordinate system. On the other hand, coordinates obtained by adding a value "480" to each y coordinate of the physical coordinates received from the touch panel 120 correspond to the logical coordinates in the logical coordinate system.

In addition to functions that a typical mobile phone has, the control unit 150 has, in particular, a function of switching between the dark mode and the light mode based on a signal output from the optical sensor 130. The control unit 150 includes a contact detection unit 151, a condition determination unit 152, a processing execution unit 153, an illumination control unit 154 and a display control unit 155.

Note that the control unit 150 manages an area specified by logical coordinates (0, 0) and logical coordinates (799, 479) in association with the display panel 111 of the touch panel 110, and manages an area specified by logical coordinates (0, 480) and logical coordinates (799, 959) in association with the display panel 121 of the touch panel 120.

When the mobile phone 100 is turned on, the control unit 150 registers, on the position storage unit 140, coordinates indicating a display position of each object displayed in the dark mode on a standby screen, which have been stored in a non-volatile memory (not illustrated) of the mobile phone 100. The coordinates indicating a display position of each object displayed in the dark mode on the standby screen are registered in the non-volatile memory by a manufacturer or the like of the mobile phone 100, and updated, for example, by a user performing an operation to change a background image.

Here, the contact detection unit 151 detects contact of user's finger or the like made to each touch panel by receiving physical coordinates from the input units 112 and 122 of the touch panels. The contact detection unit 151 also converts the received physical coordinates into logical coordinates.

The condition determination unit 152 determines whether a condition is the dark condition or the light condition based on a signal output from the optical sensor 130.

When the signal output from the optical sensor 130 indicates brightness that is equal to or higher than the second threshold and lower than the first threshold immediately after the mobile phone 100 is turned on, the condition determination unit 152 determines that a condition is the dark condition.

The condition determination unit 152 manages, on the memory, information indicating whether a condition is the dark condition or the light condition (hereinafter, referred to as "condition information"). Every time the condition changes, the condition determination unit 152 updates the condition information so as to indicate a condition after the change. Each unit included in the control unit 150 learns the brightness of ambient light with reference to the condition information.

The processing execution unit 153 determines whether the logical coordinates having been converted by the contact detection unit 151 indicate a display position of an icon, based on the coordinates stored in the position storage unit 140. When the logical coordinates indicate the display position of an icon, the processing execution unit 153 executes a processing represented by the icon.

The illumination control unit 154 switches between a mode in which both of the backlights 113 and 123 turn on and a mode in which only the backlight 113 turns on, every time a condition indicated by the condition information changes. The illumination control unit 154 also controls a luminance in a backlight to turn on.

That is to say, when the condition indicated by the condition information changes to the dark condition, in order to operate the mobile phone 100 in the dark mode, the illumination control unit 154 controls both of the backlights 113 and 123 to turn on so that a luminance in each display panel is set to a low level. On the other hand, when the condition indicated by the condition information changes to the light condition, in order to operate the mobile phone 100 in the light mode, the illumination control unit 154 controls the backlight 113 to turn on so that a luminance in the display panel 111 is set to a high level, and controls the backlight 123 to turn off.

The display control unit 155 switches between a mode in which the display panels 111 and 121 separately display objects and a mode in which only the display panel 111 displays objects, every time a condition indicated by the condition information changes.

That is to say, when the condition indicated by the condition information changes to the dark condition, in order to operate the mobile phone 100 in the dark mode, the display control unit 155 controls both of the display panels 111 and 121 to display objects, based on coordinates indicating a display position of each object in the dark mode, which have been stored in the position storage unit 140. Specifically, the display control unit 155 controls the display panel 111 of the touch panel 110 to display each object whose coordinates are included in the area specified by logical coordinates (0, 0) and logical coordinates (799, 479), which is managed in association with the display panel 111. The display control unit 155 controls the display panel 121 of the touch panel 120 to display each object whose coordinates are included in the area specified by logical coordinates (0, 480) and logical coordinates (799, 959), which is managed in association with the display panel 121.

On the other hand, when the condition indicated by the condition information changes to the light condition, in order to operate the mobile phone 100 in the light mode, the display control unit 155 controls the display panel 111 to display each object, based on coordinates indicating a display position of each object in the light mode, which have been stored in the position storage unit 140.

The display control unit 155 also registers, on the position storage unit 140, coordinates indicating a display position of each object included in a display screen after a processing of the processing execution unit 153 as coordinates indicating a display position of each object in the dark mode. That is to say, the processing execution unit 153 creates a display screen after the processing based on the premise that each object is displayed in the dark mode.

When a display screen is displayed in the light mode for the first time, the display control unit 155 also generates coordinates indicating a display position of each object in the light mode based on coordinates indicating a display position of each object in the dark mode, and registers the generated coordinates on the position storage unit 140.

<Method of Generating Coordinates Indicating Display Position in Light Mode>

The following describes an example of how the display control unit 155 generates coordinates indicating a display position in the light mode.

As for an object whose registered coordinates in the dark mode are included in the indicator display area 110M, which is the area specified by logical coordinates (0, 0) and logical coordinates (799, 99), of the display panel 111 of the touch panel 110, the display control unit 155 generates the registered coordinates as coordinates indicating a display position of the object in the light mode (in the example shown in FIG. 2A, the signal strength indicator 11, the clock 12 and the battery level indicator 13). As for an icon whose registered coordinates in the dark mode are included in the area specified by logical coordinates (0, 0) and logical coordinates (799, 479), which is managed in association with the display panel 111 of the touch panel 110, the display control unit 155 generates the registered coordinates as coordinates indicating a display position of the icon in the light mode (in the example shown in FIG. 2A, there is no icon).

As for an icon whose registered coordinates in the dark mode are included in the area specified by logical coordinates (0, 480) and logical coordinates (799, 959), which is managed in association with the display panel 121 of the touch panel 120, the display control unit 155 generates coordinates indicating a display position of the icon in the light mode in the following manner (in the example shown in FIG. 2A, the mail icon 15). That is, assuming that coordinates at an upper left position and coordinates at a lower right position constituting coordinates indicating a display position of the icon in the dark mode are respectively (x1, y1) and (x2, y2), coordinates at an upper left position and coordinates at a lower right position constituting coordinates indicating a display position of the icon in the light mode are respectively (x1, y1−480) and (x2, y2−480).

However, if an area specified by the generated coordinates at an upper left position (x1, y1−480) and the generated coordinates at a lower right position (x2, y2−480) is included in the indicator display area 110M, which is the area specified by logical coordinates (0, 0) and logical coordinates (799, 99), of the display panel 111 of the touch panel 110, coordinates at an upper left position and coordinates at a lower right position constituting coordinates indicating a display position of the icon in the light mode are respectively (x1, y1−480+100) and (x2, y2−480+100).

Also, if an area specified by the generated coordinates at an upper left position (x1, y1−480) and the generated coordinates at a lower right position (x2, y2−480), or an area specified by the generated coordinates at an upper left position (x1, y1−480+100) and the generated coordinates at a lower right position (x2, y2−480+100) includes coordinates indicating a display position of any other icon in the light mode, the display control unit 155 generates coordinates indicating a display position of the icon in the light mode in the following manner. That is, an x coordinate or a y coordinate constituting the generated coordinates is shifted by a predetermined value (e.g. 10) so that the area specified by the generated coordinates does not include the coordinates indicating a display position of any other icon.

As for an object, other than an icon, whose registered coordinates in the dark mode are included in the image display area 110G of the display panel 111 of the touch panel 110, and an object, other than an icon, whose registered coordinates in the dark mode are included in the area specified by logical coordinates that is managed in association with the display panel 121 of the touch panel 120, the display control unit 155 generates coordinates indicating a display position of the object in the light mode in the following manner (in the example shown in FIG. 2A, the background images 10 and 14). That is, the objects are connected with each other, and a size of the connected object is reduced without changing its aspect ratio so that the reduced object is centered and displayed on the image display area 110G of the display panel 111 of the touch panel 110. The display control unit 155 generates coordinates indicating a display position of the reduced object as the coordinates indicating a display position of the object in the light mode. Note that the reduced object generated by the display control unit 155 is stored in the memory as with the other objects.

For example, the number of pixels of the background image 10 shown in FIG. 2A is 800×380 (width×height), and the number of pixels of the background image 14 shown in FIG. 2A is 800×480 (width×height). Therefore, when the background images 10 and 14 are vertically connected with each other, the number of pixels of the connected image is 800×860 (width×height). In order for the connected image to be within the image display area 110G, whose number of pixels is 800×380 (width×height), of the display panel 111 of the touch panel 110, a size the connected image should be reduced by multiplying the connected image by 380/860 without changing its aspect ratio.

Note that centering and displaying the reduced object indicates displaying the reduced object so that a center of the reduced object is in the center (399, 239) of the image display area 110G of the display panel 111 of the touch panel 110.

<Operation>

Figure 5:
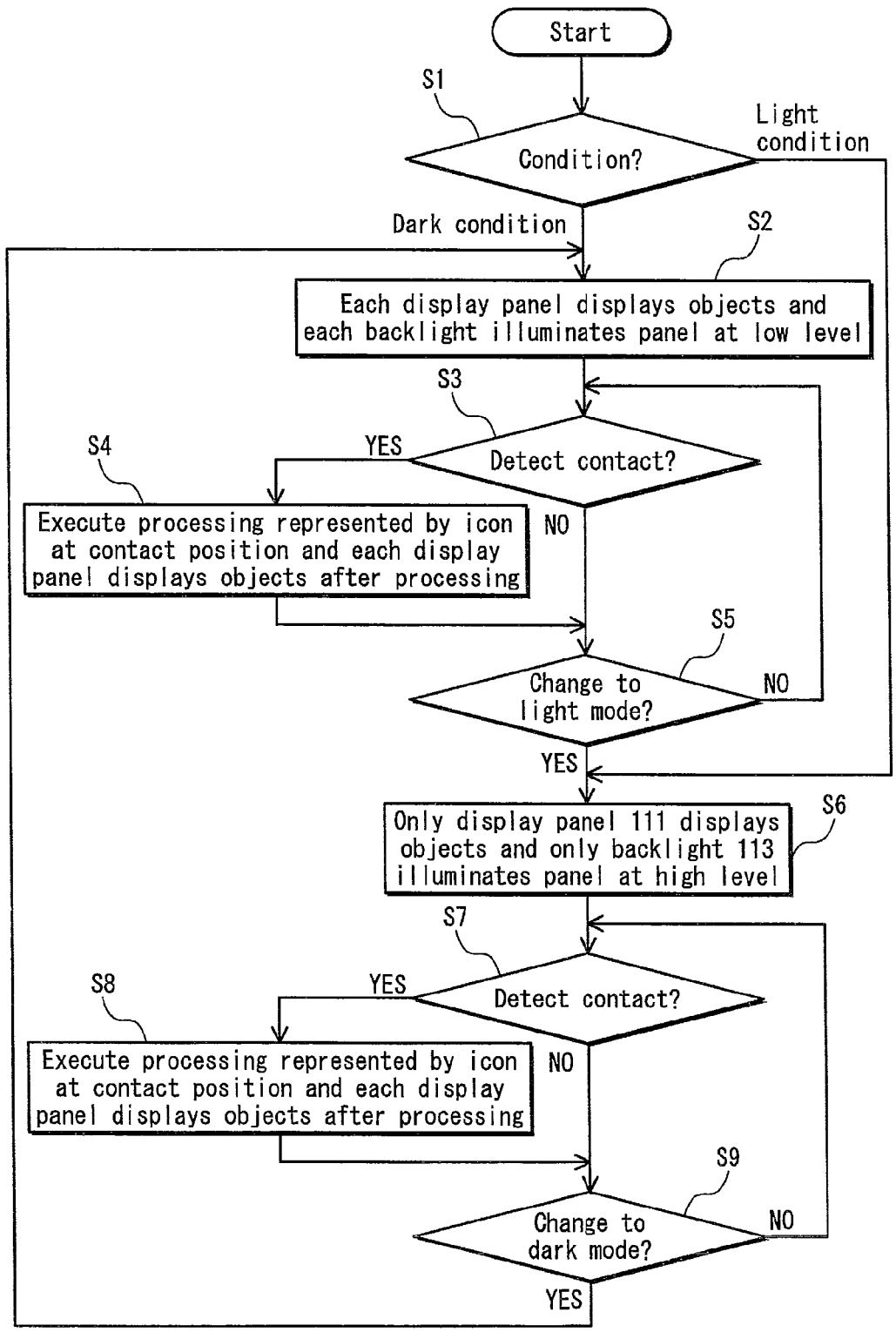
FIG. 5 is a flowchart showing a control processing performed by the mobile phone 100.

The following describes an operation of the mobile phone 100 having the above-mentioned structure with use of FIG. 5.

FIG. 5 is a flowchart showing a control processing performed by the mobile phone 100.

The control processing shown in FIG. 5 starts as the mobile phone 100 is turned on. Although not shown in FIG. 5, the control processing ends as the mobile phone 100 is turned off.

When the mobile phone 100 is turned on, the control unit 150 registers, on the position storage unit 140, coordinates indicating a display position of each object included in a standby screen in the dark mode, which have been stored in the non-volatile memory (not illustrated) of the mobile phone 100. As shown in FIG. 5, the condition determination unit 152 included in the control unit 150 determines whether a condition is the dark condition or the light condition, based on brightness measured by the optical sensor 130 (step S1).

Specifically, the condition determination unit 152 determines that the condition is the dark condition when the brightness measured by the optical sensor 130 is equal to or lower than the second threshold (step S1: dark condition), and that the condition is the light condition when the brightness measured by the optical sensor 130 is equal to or higher than the first threshold (step S1: light condition). Note that, when the brightness measured by the optical sensor 130 is higher than the second threshold and lower than the first threshold, the condition determination unit 152 determines that the condition is the dark condition (step S1: dark condition).

When determining that the condition is the dark condition (step S1: dark condition), the condition determination unit 152 updates the condition information so as to indicate the dark condition. Based on the updated condition information indicating the dark condition, the display control unit 155 included in the control unit 150 obtains coordinates indicating a display position of each object included in the standby screen in the dark mode, which have been stored in the position storage unit 140. The display control unit 155 controls the display panels 111 and 121 of the touch panels to display the objects as shown in FIG. 2A. The illumination control unit 154 included in the control unit 150 controls the backlights 113 and 123 to turn on so that a luminance in each display panel is set to a low level (step S2). That is to say, the mobile phone 100 operates in the dark mode in step S2 and later.

The contact detection unit 151 detects whether contact of user's finger or the like has been made to one of the touch panels or not, based on whether physical coordinates are received from the input units 112 or 122 of the touch panels (step S3). When detecting that contact has been made (step S3: YES), the contact detection unit 151 converts the received physical coordinates into logical coordinates. The processing execution unit 153 executes a processing represented by an icon that is displayed at a position to which contact has been made, based on the converted logical coordinates and coordinates indicating a display position of each icon in the dark mode, which have been stored in the position storage unit 140. The display control unit 155 registers, on the position storage unit 140, coordinates indicating a display position of each object included in a display screen in the dark mode after a processing of the processing execution unit 153. The display control unit 155 also controls display panels to display the objects (step S4).

Note that, when the logical coordinates at the position to which contact has been made are not included in coordinates indicating a display position of each icon in the dark mode, which have been stored in the position storage unit 140, the processing execution unit 153 and the display control unit 155 do not perform any processing.

For example, when the logical coordinates at the position to which contact has been made are included in coordinates indicating a display position of the mail icon 15 in the dark mode (a rectangle area specified by coordinates at an upper left position and coordinates at a lower right position), which have been stored in the position storage unit 140, the processing execution unit 153 executes a processing to run a mail application represented by the mail icon 15. The display control unit 155 controls each display panel to display a mail screen as shown in FIG. 6A.

Although not having been described, information indicating each icon is registered on the position storage unit 140 in association with coordinates indicating a display position of the icon in each mode. Based on the registered information, the processing execution unit 153 specifies coordinates indicating a display position of an icon in the dark mode among coordinates indicating a display position of each object. The information is registered according to instructions from the processing execution unit 153 when the display control unit 155 registers, on the position storage unit 140, coordinates indicating a display position of each object included in a display screen in the dark mode after a processing of the processing execution unit 153.

When the processing in step S4 is completed, or when contact is not detected in step S3 (step S3: NO), the condition determination unit 152 determines whether or not a condition changes from the dark condition to the light condition, based on brightness measured by the optical sensor 130 (step S5). When the brightness measured by the optical sensor 130 is lower than the first threshold, the condition determination unit 152 determines that the condition does not change from the dark condition to the light condition (step S5: NO), and a processing returns to step S3.

When the brightness measured by the optical sensor 130 is equal to or higher than the first threshold by, for example, a user carrying the mobile phone 100 moving out in the sun, the condition determination unit 152 determines that the condition changes from the dark condition to the light condition (step S5: YES). The condition determination unit 152 updates the condition information so as to indicate the light condition. Based on the updated condition information indicating the light condition, the display control unit 155 obtains coordinates indicating a display position of each object in the light mode, which have been stored in the position storage unit 140. The display control unit 155 controls the display panel 111 to display an image, and controls the display panel 121 to display no image. The illumination control unit 154 controls the backlight 113 to turn on so that a luminance in the display panel 111 is set to a high level, and controls the backlight 123 to turn off (step S6). That is to say, the mobile phone 100 operates in the light mode in step S6 and later.

Note that, in step S6, the display control unit 155 determines whether coordinates indicating a display position of each object in the light mode before the processing in step S6 are registered on the position storage unit 140. When determining that the coordinates are not registered, the display control unit 155 generates the coordinates, as described in the section of <Method of Generating Coordinates Indicating Display Position in Light Mode>, and registers the generated coordinates on the position storage unit 140. The display control unit 155 controls the display panel 111 to display each object.

A display position and size of each indicator displayed in the indicator display area 110M of the display panel 111 before the processing in step S6 do not change after the processing in step S6. Similarly, a display position and size of each icon displayed in the image display area 110G of the display panel 111 before the processing in step S6 do not change after the processing in step S6. Each icon displayed by the display panel 121 is displayed by the display panel 111, without changing its position in a lateral direction. Each object, other than an icon, displayed in the image display area 110G of the display panel 111 and each object, other than an icon, displayed by the display panel 121 are vertically connected with each other. The connected image is reduced in size without changing its aspect ratio, and displayed in the image display area 110G of the display panel 111.

For example, when display panels each display an image on a standby screen as shown in FIG. 2A before the processing in step S6, only the display panel 111 displays the image on the standby screen after the processing in step S6, as shown in FIG. 2B. For example, when display panels each display an image on a mail screen as shown in FIG. 6A before the processing in step S6, only the display panel 111 displays the image on the mail screen after the processing in step S6, as shown in FIG. 6B.

Next, similarly to the above-mentioned step S3, the contact detection unit 151 detects whether contact of user's finger or the like has been made to one of the touch panels or not (step S7). When contact is detected (step S7: YES), the processing execution unit 153 executes a processing represented by an icon that is displayed at position to which contact has been made based on the logical coordinates, which have been converted by the contact detection unit 151, and coordinates indicating a display position of each icon in the light mode, which have been stored in the position storage unit 140, similarly to the above-mentioned step S4. The display control unit 155 registers, on the position storage unit 140, coordinates indicating a display position of each object included in a display screen in the dark mode after a processing of the processing execution unit 153. The display control unit 155 also controls the display panel 111 to display each object (step S8). Note that, when the logical coordinates at a position to which contact has been made are not included in coordinates indicating a display position of each icon in the light mode, which have been stored in the position storage unit 140, the processing execution unit 153 and the display control unit 155 do not perform any processing, similarly to the above-mentioned step S4.

It is required for the display control unit 155 to generate coordinates indicating a display position of each object included in a display screen in the light mode after a processing of the processing execution unit 153, register the generated coordinates on the position storage unit 140, and perform the above-mentioned display.

When the processing in step S8 is completed, or when contact is not detected in step S7 (step S7: NO), the condition determination unit 152 determines whether or not the condition changes from the light condition to the dark condition, based on brightness measured by the optical sensor 130 (step S9). When the brightness measured by the optical sensor 130 is equal to or higher than the second threshold, the condition determination unit 152 determines that the condition does not change from the light condition to the dark condition (step S9: NO), and a processing returns to step S7.

Specifically, as described above, the condition determination unit 152 determines that the condition is the dark condition when the brightness measured by the optical sensor 130 is equal to or lower than the second threshold (step S1), and that the condition is the light condition when the brightness measured by the optical sensor 130 is equal to or higher than the first threshold (step S1). When the brightness measured by the optical sensor 130 is higher than the second threshold and lower than the first threshold, the condition determination unit 152 determines that the condition is the dark condition (step S1).

Therefore, when the brightness measured by the optical sensor 130 is lower than the first threshold but equal to or higher than the second threshold in the determination in step S9, the condition is the dark condition. Regarding the determination of whether the condition changes from the light condition to the dark condition, however, the condition determination unit 152 does not determine that the condition changes from the light condition to the dark condition unless the brightness measured by the optical sensor 130 becomes lower than the above-mentioned brightness and becomes lower than the second threshold. Therefore, a result of the determination in step S9 is "NO".

When the brightness measured by the optical sensor 130 is lower than the second threshold by, for example, a user carrying the mobile phone 100 moving into the room, the condition determination unit 152 determines that the condition changes from the light condition to the dark condition (step S9: YES), and a processing returns to step S2.

Based on the updated condition information indicating the dark condition, the display control unit 155 obtains coordinates indicating a display position of each object in the dark mode displayed before the condition changes to the dark condition, which have been stored in the position storage unit 140. As shown in FIG. 2A, the display control unit 155 controls each of the display panels 111 and 121 to display an image. The illumination control unit 154 included in the control unit 150 controls each of the backlights 113 and 123 to turn on so that a luminance in each display panel is set to a low level (step S2). The mobile phone 100 operates in the dark mode again in step S2 and later, and a processing returns to step S3, similarly to the above.

On the other hand, when the condition is the light condition (step S1: light condition), a processing starts from the processing in the above-mentioned step S6. In this case, since coordinates indicating a display position of each object included in the standby screen in the light mode are not registered on the position storage unit 140, it is required for the display control unit 155 to generate the coordinates based on the registered coordinates indicating a display position of each object included in the standby screen in the dark mode, register the generated coordinates on the position storage unit 140, and perform the above-mentioned display.

<Supplement>

Although description has been made in the above of the mobile terminal in an embodiment of the present invention, it is to be understood that the present invention is not limited to the mobile terminal as description has been made in the present embodiment, and modifications as introduced below can be made without departing from the spirit and scope thereof.

(1) Although the mobile phone 100 in the present embodiment has been described as a sliding-type mobile phone, a flip-type mobile phone, a bar-type mobile phone, or a mobile phone having other exterior forms may be adopted.

Figure 7A:
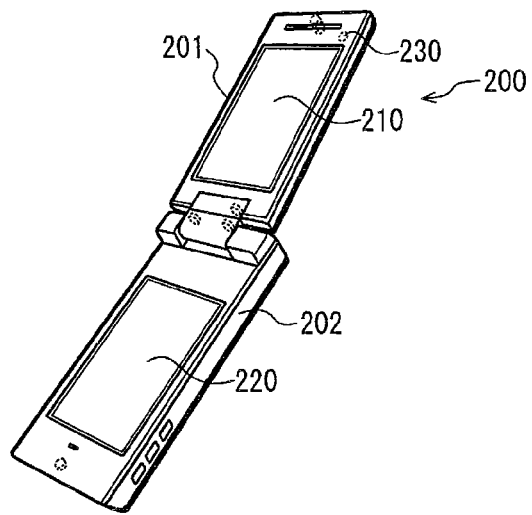
FIGS. 7A and 7B each show an appearance of a mobile phone 200 in an open state.
Figure 7B:
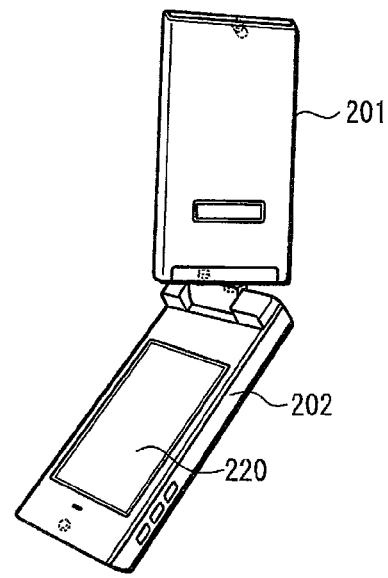
Figure 7C:
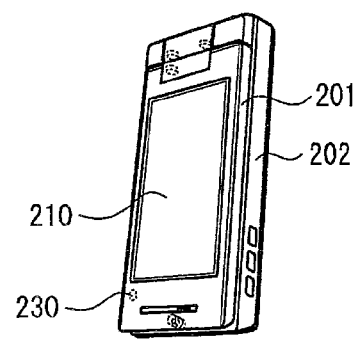
FIG. 7C shows an appearance of the mobile phone 200 in a closed state.

For example, a flip-type mobile phone 200 as shown in FIGS. 7A to 7C may be adopted.

The mobile phone 200 includes a first housing 201 and a second housing 202 that are joined in a mutually openable state. The first housing 201 includes a touch panel 210 and an optical sensor 230. The second housing 202 includes a touch panel 220.

As shown in FIG. 7A, when the mobile phone 200 is in an open state, both touch panels can be seen from the outside as the first housing 201 and the second housing 202 are mutually open. By rotating the first housing 201 180 degrees with respect to the second housing and then mutually closing the first housing 201 and the second housing 202, as shown in FIGS. 7B and 7C, the mobile phone 200 is switched to a closed state in which the touch panel 220 included in the second housing 202 is placed behind the first housing 201 and thus only the touch panel 210 included in the first housing 201 can be seen from the outside.

(2) The touch panel 120 may be controlled so as not to perform the detection of contact made by user operations when the mobile phone 100 in the present embodiment operates in the light mode, and may be controlled to resume the detection when the mobile phone 100 in the present embodiment operates in the dark mode.

As a method for controlling the touch panel 120 not to perform the detection of contact made by user operations, for example, the contact detection unit 151 may not perform a processing even when receiving physical coordinates from the input unit 122 of the touch panel 120, or power supply to the input unit 122 may be stopped so that the input unit 122 cannot perform the detection of contact made by a user.

(3) Although the mobile phone 100 in the present embodiment has been described as a sliding-type mobile phone having two touch panels 110 and 120, a bar-type mobile phone having a single large touch panel may be adopted, for example.

In such as case, it is necessary to logically divide a display area of a display panel of the single touch panel into first and second display areas, and to provide a backlight for the first display area and a backlight for the second display area. When such a mobile phone operates in the dark mode, an image is displayed in each of the first and second display areas, and a backlight for each display area turns on so that a luminance in each display area is set to a low level. When such a mobile phone operates in the light mode, an image is displayed only in the first display area and no image is displayed in the second display area, and the backlight for the first display area turns on so that a luminance in the first display area is set to a high level and a backlight for the second display area turns off.

(4) The input unit of each touch panel in the present embodiment has been described to be embodied as a capacitance-type touch sensor. As such a capacitance-type touch sensor, an appropriate type is to be selected from various types of capacitance-type touch sensors. Types of touch sensors include: a projected capacitance-type touch sensor which includes multiple electrode patterns formed on a substrate composed of plastic, glass or the like and which can detect contact made to locations thereof by measuring ratios of amperages between different electrode patterns in the vicinity of the contact location; a surface capacitance-type touch sensor which includes a conductive layer, a substrate, and electrodes provided to the edges of the substrate, in which a uniform electrostatic field is formed by the conductive layer, and the contact location is detected by measuring a ratio between the amperages of the electrodes caused by the contact made thereto by a finger or the like.

Further, although the input unit of each touch panel has been described to be embodied as a capacitance-type touch sensor, the input unit is not limited to this. Alternatively, the input unit of each touch panel may be embodied as: an electromagnetic induction touch sensor, a matrix switch touch sensor, a resistive touch sensor, a surface acoustic wave touch sensor, an infrared touch sensor, an optical sensor touch sensor or the like. In further explanation of each of the types of the touch sensors, the electromagnetic induction touch sensor requires the use of a special pen such as an electronic pen, the matrix switch touch sensor is composed of transparent electrodes having two-layer structures, the resistive touch sensor includes two resistive layers and voltage is applied to one resistive layer and the other resistive layer detects changes in voltage according to locations on the one resistive layer to which contact has been made, the surface acoustic wave touch sensor detects contact made by a finger or the like by detecting the reflection of ultrasonic waves by monitoring the voltage changes of piezoelectric elements, the infrared touch sensor detects a location thereof to which contact has been made by a finger or the like by using shielded infrared beams, and the optical sensor touch sensor detects a location thereof to which contact has been made by using an optical sensor provided to the screen.

(5) In a normal usage state of the mobile phone 100 in the present embodiment, the touch panels 110 and 120 have been described to lie in approximately the same plane and to be arranged vertically when viewed from a user. The touch panels 110 and 120, however, may be arranged horizontally. For example, when the touch panels 110 and 120 are respectively arranged to the left and to the right, the coordinates in the logical coordinate system with respect to the display panel 111 of the touch panel 110 do not change. However, the coordinates in the logical coordinate system with respect to the display panel 121 of the touch panel 120 change as follows.

That is, coordinates at an upper left position, coordinates at an upper right position, coordinates at a lower left position and coordinates at a lower right position of the display panel 121 of the touch panel 120 are respectively (800, 0), (1599, 0), (800, 479) and (1599, 479).

Accordingly, it is necessary to modify a method of generating coordinates indicating a display position in light mode of each icon whose registered coordinates in the dark mode are included in the area specified by logical coordinates (800, 0) and logical coordinates (1599, 479), which is managed in association with the display panel 121 of the touch panel 120, in the following manner.

That is, assuming that the registered coordinates at an upper left position and coordinates at a lower right position constituting coordinates indicating a display position of an icon in the dark mode are respectively (x1, y1) and (x2, y2), coordinates at an upper left position and coordinates at a lower right position constituting coordinates indicating a display position of the icon in the light mode are respectively (x1−800, y1) and (x2−800, y2).

However, if an area specified by the generated coordinates at an upper left position (x1−800, y1) and coordinates at a lower right position (x2−800, y2) is included in the indicator display area 110M, which is the area specified by logical coordinates (0, 0) and logical coordinates (799, 99), of the display panel 111 of the touch panel 110, coordinates at an upper left position and coordinates at a lower right position constituting coordinates indicating a display position of the icon in the light mode are respectively (x−800, y1+100) and (x2−800, y2+100).

Also, if the area specified by the generated coordinates at an upper left position (x1−800, y1) and coordinates at a lower right position (x2−800, y2), or by the generated coordinates at an upper left position (x1−800, y1+100) and coordinates at a lower right position (x2−800, y2+100) includes coordinates indicating a display position of any other icon in the light mode, the display control unit 155 generates coordinates indicating a display position of the icon in the light mode in the following manner. That is, an x coordinate or a y coordinate constituting the generated coordinates is shifted by a predetermined value (e.g. 10) so that the area specified by the generated coordinates does not include the coordinates indicating a display position of any other icon, as described in the present embodiment. Also, the method of generating coordinates indicating a display position in light mode of any other objects is similar to that described in the present embodiment.

(6) As shown in FIG. 1C, in an open state of the mobile phone 100 in the present embodiment, the touch panels 110 and 120 have been described to lie in approximately the same plane. The touch panels 110 and 120, however, may be arranged in any manner as long as each touch panel can be seen from a user.

For example, in the open state, the touch panels 110 and 120 may be arranged such that: a surface of the first housing 1 that includes the display panel 111 of the touch panel 110 is approximately parallel to a surface of the second housing 2 that includes the display panel 121 of the touch panel 120; or the surface of the first housing 1 that includes the display panel 111 of the touch panel 110 is angled relative to the surface of the second housing 2 that includes the display panel 121 of the touch panel 120 as long as a user can see a display panel of each touch panel.

In the present embodiment, the number of pixels of an LCD included in a display panel of each touch panel has been described to be the same, and the LCD has been described to have an approximately rectangular shape. However, the number of pixels of the LCD may be different for each display panel, and the LCD may have a circular shape and a polygonal shape, for example.

Needless to say, it is necessary to generate coordinates indicating a display position in light mode so that the display panel 111 can display each object displayed in the dark mode according to the number of pixels and the shape of the LCD.

(7) In FIGS. 2A and 2B, a description has been made of an example in which a single icon (mail icon 15) is displayed. Similarly to the example described in the present embodiment, however, the present invention can be implemented in a case in which a plurality of icons are displayed. Also in FIGS. 2A and 2B, a description has been made of an example in which the background image and the icon are displayed. Similarly to the example described in the present embodiment, however, the present invention can be implemented in a case in which only one of the background image and the icon is displayed.

Also in the present embodiment, a description has been made of an example in which each indicator is displayed in the indicator display area 110M. Similarly to the example described in the present embodiment, however, the present invention can be implemented in a case in which each indicator is not displayed. Note that, in such a case, it is unnecessary to provide the indicator display area 110M to the display panel 111 of the touch panel 110. Therefore, an entire display area of the display panel 111 is made as the image display area 110G.

(8) In the present embodiment, the background image 16 shown in FIG. 2B has been described to be generated by vertically connecting the background images 10 and 14 and then reducing a size of the connected image so as to be within the image display area 110G of the display panel 111 of the touch panel 110. The background image 16, however, may be generated by reducing a size of each of the background images 10 and 14 and then connecting the reduced background images. That is, since the number of pixels of the background images 10 and 14 in the longitudinal direction is respectively 380 and 480, a size of the background image 10 may be reduced without changing its aspect ratio so that the number of pixels of the background image 10 in the longitudinal direction is 380×380/(380+480), and a size of the background image 14 may be reduced without changing its aspect ratio so that the number of pixels of the background image 14 in the longitudinal direction is 480×380/(380+480).

(9) The method of generating coordinates indicating a display position in light mode described in the present embodiment is just an example. Therefore, the method is not limited to that described in the present embodiment. Any other method may be employed as long as the display panel 111 can display each object displayed in the dark mode. For example, the coordinates indicating a display position in the light mode of each icon may be generated such that one or more icons displayed in the dark mode in the image display area 110G of the display panel 111 of the touch panel 110 are gathered in the right half of the image display area 110G and one or more icons displayed in the dark mode by the display panel 121 of the touch panel 120 are gathered in the left half of the image display area 110G of the display panel 111 of the touch panel 110.

(10) In the present embodiment, the processing execution unit 153 creates a display screen after the processing based on the premise that each object is displayed in the dark mode. The processing execution unit 153, however, may create a display screen after the processing based on the premise that each object is displayed in the light mode.

In such a case, the display control unit 155 registers, on the position storage unit 140, coordinates indicating a display position of each object included in a display screen after a processing of the processing execution unit 153 as coordinates indicating a display position in the light mode, and generates coordinates indicating a display position of each object in the dark mode when each object is displayed in the dark mode.

Any method may be employed as the generating method as long as objects displayed in the light mode are separately displayed by the display panels 111 and 121. The following describes an example of the generating method.

As for an object whose registered coordinates in the light mode are included in the indicator display area 110M, which is the area specified by logical coordinates (0, 0) and logical coordinates (799, 99), of the display panel 111 of the touch panel 110, the display control unit 155 generates the registered coordinates indicating a display position in the light mode as coordinates indicating a display position in the dark mode (in the example shown in FIG. 2B, the signal strength indicator 11, the clock 12 and the battery level indicator 13).

When the objects include a plurality of icons, as for a half of the icons, the display control unit 155 generates the registered coordinates indicating a display position in the light mode as coordinates indicating a display position in the dark mode. As for the other half of the icons, the display control unit 155 generates coordinates indicating a display position in the dark mode in the following manner. That is, assuming that the registered coordinates at an upper left position and coordinates at a lower right position constituting coordinates indicating a display position in the light mode are respectively (x1, y1) and (x2, y2), coordinates at an upper left position and coordinates at a lower right position constituting coordinates indicating a display position in the dark mode are respectively (x1, y1+380) and (x2, y2+380).

A background image is divided into a top image whose y coordinate is in a range of 100 to 167 and a bottom image whose y coordinate is in a range of 168 to 479. The top image is enlarged without changing its aspect ratio so as to be displayed within the image display area 110G of the display panel 111 of the touch panel 110. The bottom image is enlarged without changing its aspect ratio so as to be displayed by the display panel 121 of the touch panel 120. The display control unit 155 generates coordinates indicating a display position of the enlarged top image and coordinates indicating a display position of the enlarged bottom image as coordinates indicating a display position in the dark mode.

As a further modification, the processing execution unit 153 may create a display screen after the processing so that the display screen after the processing is displayed according to a mode (i.e. the dark mode or the light mode) of the mobile phone 100 at the time of displaying the display screen after the processing. The display control unit 155 may register, on the position storage unit 140, coordinates indicating a display position of each object included in the display screen after the processing as coordinates indicating a display position in the dark mode or coordinates indicating a display position in the light mode, according to the mode of the display screen created by the processing execution unit 153.

(11) In the present embodiment, although the display control unit 155 has been described to generate coordinates indicating a display position in the light mode when an image is displayed in the light mode, the coordinates may be generated in advance. For example, the coordinates may be generated when the coordinates indicating a display position in the dark mode are registered on the position storage unit 140. This can also be applied to the modification described in the above-mentioned (10).

(12) The mobile phone 100 in the present embodiment has been described to switch between the dark mode and the light mode in response to a change from/to the dark condition in which the brightness measured by the optical sensor 130 is equal to or lower than the second threshold to/from the light condition in which the measured brightness is equal to or higher than the first threshold, and operate accordingly.

The condition, however, may be determined such that a condition in which the measured brightness is lower than a single threshold (e.g. approximately 5000 lx) is set to the dark condition and a condition in which the measured brightness is equal to or higher than the single threshold is set to the light condition, and the mode may be switched in response to a change of the determined condition. However, when the brightness measured by the optical sensor 130 hovers around the single threshold, the mode can be switched frequently. Therefore, determination of the condition based on the brightness measured by the optical sensor 130 may be performed at relatively long intervals (e.g. every few seconds).

(13) In the present embodiment, the control processing shown in FIG. 5 has been described to start when the mobile phone 100 is turned on, and end when the mobile phone 100 is turned off The control processing, however, may start when the mobile phone 100 is switched from the closed state to the open state, and end when the mobile phone 100 is switched from the open state to the closed state. In such a case, since the touch panel 120 cannot be seen from the outside after the mobile phone 100 is switched from the open state to the closed state, only the display panel 111 may display an image, the backlight 123 may turn off, and the backlight 113 may turn on so that the luminance in the display panel 111 is set to a low level or a high level according to the condition based on the brightness measured by the optical sensor 130, similarly to a case where the mobile phone 100 operates in the light mode.

(14) The backlights 113 and 123 of the respective touch panels may turn off when at least a predetermined time has elapsed since the last operation performed by a user to either of the touch panels. In such a case, the control processing shown in FIG. 5 may end at a timing when the backlights turn off, and may start when a next operation is performed by a user to either of the touch panels.

(15) In the present embodiment, as shown in FIG. 6B, a received mail list and a body of a selected mail, which are separately displayed by display panels of the touch panels in the dark mode as shown in FIG. 6A, have been described to be vertically connected, and then reduced in size so that the connected image is displayed in the image display area 110G of the display panel 111 of the touch panel 110 in the light mode. Instead of being connected vertically, however, these images may be connected horizontally, and then reduced in size so that the connected image can be displayed in the image display area 110G of the display panel 111 of the touch panel 110.

Relative position between two images to be connected vertically or horizontally may be determined appropriately as long as the two images can be displayed in the image display area 110G of the display panel 111 of the touch panel 110.

For example, when the two images are connected horizontally, the two images may be connected such that positions of top edges of the two images correspond to each other, or may be connected such that the positions of the top edges of the two images does not correspond to each other as long as the connected image can be displayed in the image display area 110G of the display panel 111 of the touch panel 110.

Sizes of the two images to be connected may differ from each other. Also in such a case, relative position between the two images may be determined appropriately as long as the two images can be displayed in the image display area 110G of the display panel 111 of the touch panel 110.

Whether the two images are connected vertically or horizontally may be set, for each display screen, by a manufacturer of the mobile phone 100 in advance, or by a user.

Instead of connecting the two images so that the two images fit together, the two images may be connected so that a gap is formed between the two images as long as the connected image is displayed in the image display area 110G of the display panel 111 of the touch panel 110.

(16) In the present embodiment, although display in the light mode has been described to be performed using the display panel 111 of the touch panel 110, the display in the light mode may be performed using the display panel 121 of the touch panel 120.

Also, which one of the display panels of the touch panels is used to perform display in the light mode may be set by a user, or may be determined such that the display panel of the touch panel to which a user performed an operation immediately before the display in the light mode is performed is used.

(17) In the present embodiment, a size of each of the indicators and icons displayed in the light mode has been described to be the same as that of each of the indicators and icons displayed in the dark mode. The size of each of the indicators and icons, however, may be changed as long as each indicator can be visually recognized and user operation to each icon can be performed.

In such a case, for example, a user may set an appropriate size. Alternatively, indicators and icons of several sizes may be displayed by the display panel at the time when the mobile phone 100 starts operating, and the user may select an indicator of a size large enough to be visually recognized and an icon of a selectable size (a size large enough to make contact with the user's finger or the like).

(18) The second and first thresholds used by the condition determination unit 152 in the present embodiment to determine whether the condition based on the brightness measured by the optical sensor 130 is the dark condition or the light condition have been described to be equivalent to normal room brightness and brightness in the shade (e.g. approximately 1000 lx), and to brightness in the sun (e.g. approximately 100,000 lx), respectively. However, these are examples of the first and second thresholds, and the first and second thresholds may each have any other value. For example, the first and second thresholds may be appropriately set by a user.

(19) The mobile phone 100 in the present embodiment has been described to automatically switch between the dark mode and the light mode based on the brightness measured by the optical sensor 130. The mobile phone may switch between the dark mode and the light mode according to a user operation.

In such a case, the above-mentioned first and second thresholds may be updated based on the brightness measured by the optical sensor 130 at the time when the user operation to switch between the dark mode and the light mode is performed. For example, when the second threshold is 1000 lx and the brightness measured by the optical sensor 130 at the time when the user operation to switch from the light mode to the dark mode is performed is 1200 lx, the second threshold may be updated so as to be 1100 lx, which is an average of the second threshold and the brightness measured by the optical sensor 130, or may be updated so as to be 1200 lx, which is the brightness measured by the optical sensor 130.

(20) In the present embodiment, a description has been made of an example that uses the backlights 113 and 123 each turning on and off, and performing control so that a luminance in a corresponding display panel is set to one of the two levels (i.e. a low level or a high level) in an ON state. The backlight, however, is not limited to this. It is possible to use a backlight that can switch a luminance in the corresponding display panel among three luminance, that is, a first luminance, a second luminance higher than the first luminance, and a third luminance lower than the first luminance.

In a case where such a backlight is used, it is necessary to modify a processing performed by the illumination control unit 154 in the following manner That is, the illumination control unit in this modification controls, when a condition based on the brightness measured by the optical sensor 130 is the dark condition, each backlight so that each of the display panels 111 and 121 displays an image at the first luminance, and controls, when the condition changes from the dark condition to the light condition, the backlight 113 so that the display panel 111 displays an image at the second luminance and controls the backlight 123 so that the display panel 121 displays an image at the third luminance.

When the illumination control unit in this modification controls the backlight 123 so that the display panel 121 displays the image at the third luminance, the display control unit 155 may control the display panel 121 to display the image. Note that, needless to say, it is preferable to control the display panel 121 not to display the image in terms of power saving.

(21) The mobile phone 100 in the present embodiment includes two display panels 111 and 121, switches, according to a condition (i.e. the dark condition or the light condition) based on the brightness measured by the optical sensor 130, a display mode between a mode in which the two display panels are used and a mode in which only one of the two display panels is used, and operates accordingly. This can also be applied to a mobile phone including three or more display panels.

The following describes an example of a method of controlling a mobile phone including three display panels. When a condition based on the brightness measured by the optical sensor 130 is the dark condition, the mobile phone controls each of the three display panels to display an image at a low luminance level. When the condition changes from the dark condition to the light condition, the mobile phone controls one of the three display panels to display, at a high luminance level, an image whose content is determined so as to include a content of an image displayed in each of the three display panels, and controls the other two display panels so that a luminance in the two display panels is set to zero.

Alternatively, when the condition changes from the dark condition to the light condition, the mobile phone may control, rather than controlling the one of the three display panels to display the image whose content is determined so as to include a content of an image displayed in each of the three display panels, two of the three display panels to separately display the image at a high luminance level, and control the other display panel so that the luminance in the other display panel is set to zero.

(22) In the present embodiment, the control unit 150 has been described to manage and process coordinates on the display panels 111 and 121 of the touch panels as logical coordinates. The control unit 150, however, may manage and process the coordinates as individual coordinates in an x and y coordinate system for each display panel, namely, physical coordinates themselves. In such a case, it is necessary to register, on the position storage unit 140, information specifying a display panel of a touch panel to which an image is to be displayed, in association with the coordinates indicating a display position in each mode.

(23) Further, the components on which explanation has been made in the present embodiment may be partially or entirely embodied as an integrated circuit having one chip or multiple chips. Further, the components may also be embodied as a computer program or as any type of embodiment.

Further, the components explanation of which has been made in the present embodiment operate in a cooperative manner with the processor included in the mobile phone, and thus, realize the functions provided thereto.

(24) It may be conceived to distribute a program for causing a processor to execute the control processing performed by the mobile phone 100 (see FIG. 5) as explanation has been made in the present embodiment. The distribution of such a program may be realized by recording the program onto recording media, or transmitting the program via various communication paths. The recording media which may be used in such distribution of the program include IC cards, hard disks, optical discs, flexible disks, ROMs, flash memories, and the like. The distributed program is to be stored to a memory or the like which may be read by the processor provided to devices, so that the processor may access and execute the program. Thereby, each of the functions of each of the mobile phones description has been made on in the present embodiment is to be realized.

(25) Part or all of the modifications described in the above (1) to (24) may be combined and applied to the mobile phone 100 in the present embodiment.

(26) In the following, description is provided on a structure of a mobile terminal in one embodiment of the present invention as well as on modifications thereof. Additionally, description is made on the advantageous effects of such mobile terminals.

(a) One embodiment of the present invention provides a mobile terminal comprising: a display unit having first and second display areas; an optical sensor configured to measure brightness of ambient light; and a control unit configured to, under a first condition in which the brightness measured by the optical sensor is lower than a first threshold, control the display unit to display a first image in the first display area at a first luminance, and to display a second image in the second display area at the first luminance, and under a second condition in which the measured brightness is equal to or higher than the first threshold, control the display unit to display a third image in the first display area at a second luminance that is higher than the first luminance, and to set a luminance in the second display area to a third luminance that is lower than the first luminance, a content of the third image being determined so as to include a content of the first image and a content of the second image.

Here, the content of the third image is determined so as to include the content of the first image and the content of the second image. Objects constituting the third image may be displayed in the same manner as those constituting each of the first and second images, or may be displayed in a different manner from those constituting each of the first and second images. That is to say, the third image may include an object that is obtained by increasing or decreasing a size of an object constituting each of the first and second images or by connecting a plurality of objects constituting each of the first and second images. Also, arrangement of one or more objects constituting the third image may differ from that of one or more objects constituting each of the first and second images.

According to the mobile terminal in the one embodiment of the present invention having the above-mentioned structure, under the second condition in which the brightness measured by the optical sensor is equal to or higher than the first threshold, the third image, whose content is determined so as to include the content of the first image and the content of the second image displayed in respective display areas under the first condition, is displayed in the first display area. Therefore, it is possible to continuously display the content of the first image and the content of the second image.

Also, under the second condition, the mobile terminal increases the luminance in the first display area and reduces the luminance in the second display area. Therefore, it is possible to suppress increase in power consumption in displaying images, while suppressing reduction in visibility of the first display area.

(b) Also, the display unit may be composed of: a first display unit that has the first display area and includes a first illumination subunit configured to illuminate the first display area; and a second display unit that has the second display area and includes a second illumination subunit configured to illuminate the second display area, and, under the first condition, the control unit may control the first illumination subunit to illuminate the first display area so that a luminance in the first display area is set to the first luminance, and control the second illumination subunit to illuminate the second display area so that the luminance in the second display area is set to the first luminance, and, under the second condition, the control unit may control the first illumination subunit to illuminate the first display area so that the luminance in the first display area is set to the second luminance, and control the second illumination subunit to illuminate the second display area so that the luminance in the second display area is set to the third luminance.

With the above-mentioned structure, under the second condition, the mobile terminal controls the first illumination subunit to illuminate the first display area so that the luminance in the first display area increases compared with that under the first condition, and controls the second illumination subunit to illuminate the second display area so that the luminance in the second display area decreases compared with that under the first condition. Therefore, it is possible to suppress increase in power consumption in displaying images, while suppressing reduction in visibility of the first display area.

(c) Also, the third luminance may be zero, and the control unit may control the second illumination subunit not to illuminate the second display area under the second condition.

With the above-mentioned structure, the mobile terminal controls the second illumination subunit not to illuminate the second display area under the second condition. Therefore, it is possible to further suppress increase in power consumption in displaying images.

(d) Also, the mobile terminal may further comprise: a first touch sensor configured to detect a position in the first display area to which contact has been made; and a second touch sensor configured to detect a position in the second display area to which contact has been made, wherein, under the first condition, the control unit may control the first touch sensor to perform the detection, and control the second touch sensor to perform the detection, and under the second condition, the control unit may control the second touch sensor not to perform the detection.

With the above-mentioned structure, the mobile terminal controls, under the second condition, the second touch sensor not to detect the position in the second display area to which contact has been made. Therefore, it is possible to further suppress increase in power consumption of the mobile terminal.

(e) Also, each of the first and second images may be composed of a plurality of types of objects, and the third image may include an image obtained by connecting objects of the same type included in the first and second images and reducing a size of the connected object.

With the above-mentioned structure, under the second condition, the mobile terminal displays, in the first display area, the third image that includes the image obtained by connecting objects of the same type (e.g. background images) included in the first and second images, which are displayed in the respective display areas under the first condition, and reducing a size of the connected object. Therefore, it is possible for a user to continuously refer to the content of the first image and the content of the second image displayed in the respective display areas under the first condition.

(f) Also, each of the first and second images may be composed of a plurality of types of objects, and the third image may include one of the plurality of types of objects included in each of the first and second images.

With the above-mentioned structure, under the second condition, the mobile terminal displays, in the first display area, the third image that includes one of the plurality of types of objects (e.g. an icon and various indicators indicating a status of the mobile terminal) included in each of the first and second images, which are displayed in the respective display areas under the first condition. Therefore, it is possible for a user to continuously refer to the content of the first image and the content of the second image displayed in the respective display areas under the first condition.

(g) Also, under a third condition in which the measured brightness is equal to or lower than a second threshold that is lower than the first threshold, the control unit may control the display unit to display a fifth image in the first display area at the first luminance, and to display a sixth image in the second display area at the first luminance, a content of the fifth image and a content of the sixth image each being determined so as to be included in a content of a fourth image displayed in the first display area under the second condition.

Here, the content of the fifth image and the content of the sixth image are each determined so as to be included in the content of the fourth image. Similarly to the above-mentioned third image, objects constituting each of the fifth and sixth images may be displayed in the same manner as those constituting the fourth image, or may be displayed in a different manner from those constituting the fourth image.

According to the mobile terminal, under the third condition in which the brightness measured by the optical sensor is equal to or lower than the second threshold that is lower than the first threshold, the fifth and sixth images, whose contents are each determined so as to be included in the content of the fourth image displayed in the first display area under the second condition, are displayed in the first and second display areas, respectively. Therefore, it is possible to continuously display contents that a user wishes to refer to.

Also, by appropriately setting the second threshold that is lower than the first threshold, it is possible to prevent an inconvenience that a mode is frequently switched between a display mode in which only the first display area is used and a mode in which each display area is used, when the mobile terminal is used at a place where the brightness measured by the optical sensor 130 hovers around the first threshold.

Also, under the third condition, the mobile terminal decreases the luminance in the first display area from the second luminance to the first luminance. Therefore, it is possible to suppress increase in power consumption in displaying images, while suppressing reduction in visibility of the first display area. At the same time the mobile terminal increases the luminance in the second display area from the third luminance to the first luminance. Therefore, it is also possible to ensure visibility of the second display area.

(h) Also, while the third image is displayed in the first display area under the second condition, the control unit may control the display unit to display no image in the second display area.

Under the second condition, the mobile terminal displays no image in the second display area. Therefore, for example, by stopping supplying power to the second display area, it is possible to further reduce power consumption of the mobile terminal.

(27) The first display unit including the first illumination subunit, and the first touch sensor of the mobile terminal of the present invention correspond to the touch panel 110 including the display panel 111, the input unit 112 and the backlight 113 of the mobile phone 100 in the present embodiment. The second display unit including the second illumination subunit, and the second touch sensor of the mobile terminal of the present invention correspond to the touch panel 120 including the display panel 121, the input unit 122 and the backlight 123 of the mobile phone 100 in the present embodiment. The optical sensor of the mobile terminal of the present invention corresponds to the optical sensor 130 of the mobile phone 100 in the present embodiment. The control unit of the mobile terminal of the present invention corresponds to the control unit 150 of the mobile phone 100 in the present embodiment.

(28) The display control method of the present invention is achieved, for example, by the mobile phone in the present embodiment (see, in particular, procedures for control processing described with reference to FIG. 5).

INDUSTRIAL APPLICABILITY

The mobile terminal of the present invention is used when images are displayed in a plurality of display areas.

[Reference Signs List]

| | |
|---|---|
| 1, 201 | first housing |
| 2, 202 | second housing |
| 4, 4' | coupling mechanism |
| 5 | coupling piece |
| 6 | guide groove |
| 7 | speaker |
| 8 | microphone |
| 30, 30', 31, 31' | pin |
| 100, 200 | mobile phone |
| 110, 120, 210, 220 | touch panel |
| 111, 121 | display panel |
| 112, 122 | input unit |
| 113, 123 | backlight |
| 130, 230 | optical sensor |
| 140 | position storage unit |
| 150 | control unit |
| 151 | contact detection unit |
| 152 | condition determination unit |
| 153 | processing execution unit |
| 154 | illumination control unit |
| 155 | display control unit |

The invention claimed is:

1. A mobile terminal comprising:
a display unit having first and second display areas;
an optical sensor configured to measure brightness of ambient light; and
a control unit configured to operate under a first condition in which the brightness measured by the optical sensor is lower than a first threshold and a second condition in which the measured brightness is equal to or higher than the first threshold,
under the first condition, controlling the display unit to display a first image in the first display area at a first luminance, and to display a second image in the second display area at the first luminance, only upon detecting the first condition out of the first condition and the second condition, and
under the second condition, controlling the display unit to display a third image in the first display area at a second luminance that is higher than the first luminance, and to set a luminance in the second display area to a third luminance that is lower than the first luminance, a content of the third image being determined so as to include a content of the first image and a content of the second image, only upon detecting the second condition out of the first condition and the second condition.

2. The mobile terminal of claim 1, wherein
the display unit is composed of:
a first display unit that has the first display area and includes a first illumination subunit configured to illuminate the first display area; and
a second display unit that has the second display area and includes a second illumination subunit configured to illuminate the second display area, and
under the first condition, the control unit controls the first illumination subunit to illuminate the first display area so that a luminance in the first display area is set to the first luminance, and controls the second illumination subunit to illuminate the second display area so that the luminance in the second display area is set to the first luminance, and
under the second condition, the control unit controls the first illumination subunit to illuminate the first display area so that the luminance in the first display area is set to the second luminance, and controls the second illumination subunit to illuminate the second display area so that the luminance in the second display area is set to the third luminance.

3. The mobile terminal of claim 2, wherein
the third luminance is zero, and
the control unit controls the second illumination subunit not to illuminate the second display area under the second condition.

4. The mobile terminal of claim 2, further comprising:
a first touch sensor configured to detect a position in the first display area to which contact has been made; and
a second touch sensor configured to detect a position in the second display area to which contact has been made, wherein
under the first condition, the control unit controls the first touch sensor to perform the detection, and controls the second touch sensor to perform the detection, and
under the second condition, the control unit controls the second touch sensor not to perform the detection.

5. The mobile terminal of claim 4, wherein
each of the first and second images is composed of a plurality of types of objects, and
the third image includes an image obtained by connecting objects of the same type included in the first and second images and reducing a size of the connected object.

6. The mobile terminal of claim 4, wherein
each of the first and second images is composed of a plurality of types of objects, and
the third image includes one of the plurality of types of objects included in each of the first and second images.

7. The mobile terminal of claim 1, wherein
under a third condition in which the measured brightness is equal to or lower than a second threshold that is lower than the first threshold, the control unit controls the display unit to display a fifth image in the first display area at the first luminance, and to display a sixth image in the second display area at the first luminance, a content of the fifth image and a content of the sixth image each being determined so as to be included in a content of a fourth image displayed in the first display area under the second condition.

8. The mobile terminal of claim 1, wherein
while the third image is displayed in the first display area under the second condition, the control unit controls the display unit to display no image in the second display area.

9. A non-transitory recording medium having stored thereon a display control program used in a mobile terminal, the mobile terminal including a display unit having first and second display areas, and an optical sensor measuring brightness of ambient light, the display control program comprising:

a control step of operating under a first condition in which the brightness measured by the optical sensor is lower than a first threshold and a second condition in which the measured brightness is equal to or higher than the first threshold, under the first condition, controlling the display unit to display a first image in the first display area at a first luminance, and to display a second image in the second display area at the first luminance, only upon detecting the first condition out of the first condition and the second condition, and under the second condition, controlling the display unit to display a third image in the first display area at a second luminance that is higher than the first luminance, and to set a luminance in the second display area to a third luminance that is lower than the first luminance, a content of the third image being determined so as to include a content of the first image and a content of the second image, only upon detecting the second condition out of the first condition and the second condition.

10. A display control method used in a mobile terminal, the mobile terminal including a display unit having first and second display areas, and an optical sensor measuring brightness of ambient light, the display control method comprising:

a control step of operating under a first condition in which the brightness measured by the optical sensor is lower than a first threshold and a second condition in which the measured brightness is equal to or higher than the first threshold, under the first condition, controlling the display unit to display a first image in the first display area at a first luminance, and to display a second image in the second display area at the first luminance, only upon detecting the first condition out of the first condition and the second condition, and under the second condition, controlling the display unit to display a third image in the first display area at a second luminance that is higher than the first luminance, and to set a luminance in the second display area to a third luminance that is lower than the first luminance, a content of the third image being determined so as to include a content of the first image and a content of the second image, only upon detecting the second condition out of the first condition and the second condition.

* * * * *